(12) United States Patent
Shoji et al.

(10) Patent No.: US 7,576,335 B2
(45) Date of Patent: Aug. 18, 2009

(54) SCINTILLATOR PLATE

(75) Inventors: Takehiko Shoji, Hachioji (JP); Shinji Kudo, Hino (JP)

(73) Assignee: Konica Minolta Medical & Graphic, Inc. (JP)

(*) Notice: Subject to any disclaimer, the term of this patent is extended or adjusted under 35 U.S.C. 154(b) by 0 days.

(21) Appl. No.: 11/600,478

(22) Filed: Nov. 16, 2006

(65) Prior Publication Data

US 2007/0114447 A1    May 24, 2007

(30) Foreign Application Priority Data

Nov. 22, 2005    (JP) .............................. 2005-336970

(51) Int. Cl.
*G01J 1/58* (2006.01)
*G01N 21/64* (2006.01)
*G01T 1/00* (2006.01)

(52) U.S. Cl. .................... 250/483.1; 250/581

(58) Field of Classification Search .............. 250/483.1, 250/484.2, 484.3, 484.4, 581

See application file for complete search history.

(56) References Cited

U.S. PATENT DOCUMENTS

| | | | | |
|---|---|---|---|---|
| 5,418,377 | A | * | 5/1995 | Tran et al. ................ 250/483.1 |
| 6,600,158 | B1 | * | 7/2003 | Okada et al. ........... 250/370.11 |
| 6,847,041 | B2 | * | 1/2005 | Okada et al. ........... 250/370.11 |
| 7,265,371 | B2 | * | 9/2007 | Shoji et al. .................. 250/581 |
| 2005/0218340 | A1 | * | 10/2005 | Tazaki et al. ............. 250/484.4 |

FOREIGN PATENT DOCUMENTS

| | | | | |
|---|---|---|---|---|
| JP | | 01044900 A | * | 2/1989 |
| JP | | 2000-9846 | | 1/2000 |
| JP | | 2000-284053 | | 10/2000 |
| JP | | 2004264231 A | * | 9/2004 |

* cited by examiner

*Primary Examiner*—David P Porta
*Assistant Examiner*—Kiho Kim
(74) *Attorney, Agent, or Firm*—Cantor Colburn LLP

(57) ABSTRACT

An object is to provide that a moisture resistance property is maintained, and reduction of sharpness is further avoided. Disclosed is a scintillator plate possessing a support and provided thereon a phosphor layer, and further a protective film provided on the phosphor layer to protect the phosphor layer, wherein an arithmetical mean slope angle Δa of surface roughness of the protective film is 0.01-0.4.

3 Claims, 2 Drawing Sheets

SCINTILLATOR PLATE

This application claims priority from Japanese Patent Application No. 2005-336970 filed on Nov. 22, 2005, which is incorporated hereinto by reference.

TECHNICAL FIELD

The present invention relates to a scintillator plate generating fluorescence by being exposed to radiation.

BACKGROUND

Radiation images such as X-ray images have been used widely for diagnoses of medical conditions in medical sites. In particular, radiation images of an intensifying screen-film type wherein high sensitivity and high image quality have been attained in a long history are still used in the medical sites all over the world as an imaging system having the high reliability and cost effectiveness. In recent years, a digital type radiation image detector represented by a flat panel radiation detector [FPD (Flat Panel Detector)] is also making an appearance, which makes it possible to obtain radiation images as digital information, to conduct image processing freely, or to transmit image information instantly.

The aforesaid detector has a so-called "scintillator plate" that converts radiation into fluorescence. The scintillator plate is one that receives radiation transmitted through an object and emits instantly fluorescence having intensity corresponding to a dose of the radiation, and it has a structure in which a phosphor layer is formed on a support.

Meanwhile, the phosphor layer mentioned above is made of a material (cesium iodide) having deliquescent properly in many cases, and it has drawbacks that it tends to be deteriorated with the passage of time accordingly. Therefore, a protective layer is formed on the surface of the phosphor layer to protect it from chemical degeneration and physical impact shock. For example, as a protective layer of that kind, those employing polyparaxylene are disclosed in Patent Document 1, and those employing an organic film made of parylene are disclosed in Patent Document 2. In addition to the foregoing, organic polymer films of polypropylene or of polyethylene terephthalate are known.

(Patent Document 1) Japanese Patent O.P.I. Publication No. 2000-9846

(Patent Document 2) Japanese Patent O.P.I. Publication No. 2000-284053

SUMMARY

However, each of the protective layers described in Patent Document 1 and Patent Document 2 is slightly poor in moisture resistance, and it cannot protect the phosphor layer sufficiently from deterioration with the passage of time. In contrast to this, a protective layer composed of an organic polymer film is excellent in moisture resistance, and it can protect the phosphor layer sufficiently from deterioration with the passage of time. However, a refractive index of the film is great, and thereby, a part of fluorescence emerging from the phosphor layer and entering the protective layer keeps transmitting in the protective layer, while repeating total reflection on upper and bottom interfaces of the film, and emerges from a side edge portion of the protective layer. As a result, an amount of fluorescence transmitted through protective layer is reduced and sharpness of the scintillator plate itself is lowered. An objective of the present invention is to prevent a decline of sharpness while maintaining moisture resistance performance. Also disclosed is a scintillator plate possessing a support and provided thereon a phosphor layer, and further a protective film provided on the phosphor layer to protect the phosphor layer, wherein an arithmetical mean slope angle $\Delta a$ of surface roughness of the first protective film is 0.01-0.4.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

DESCRIPTION OF THE PREFERRED EMBODIMENTS

Figure 1:
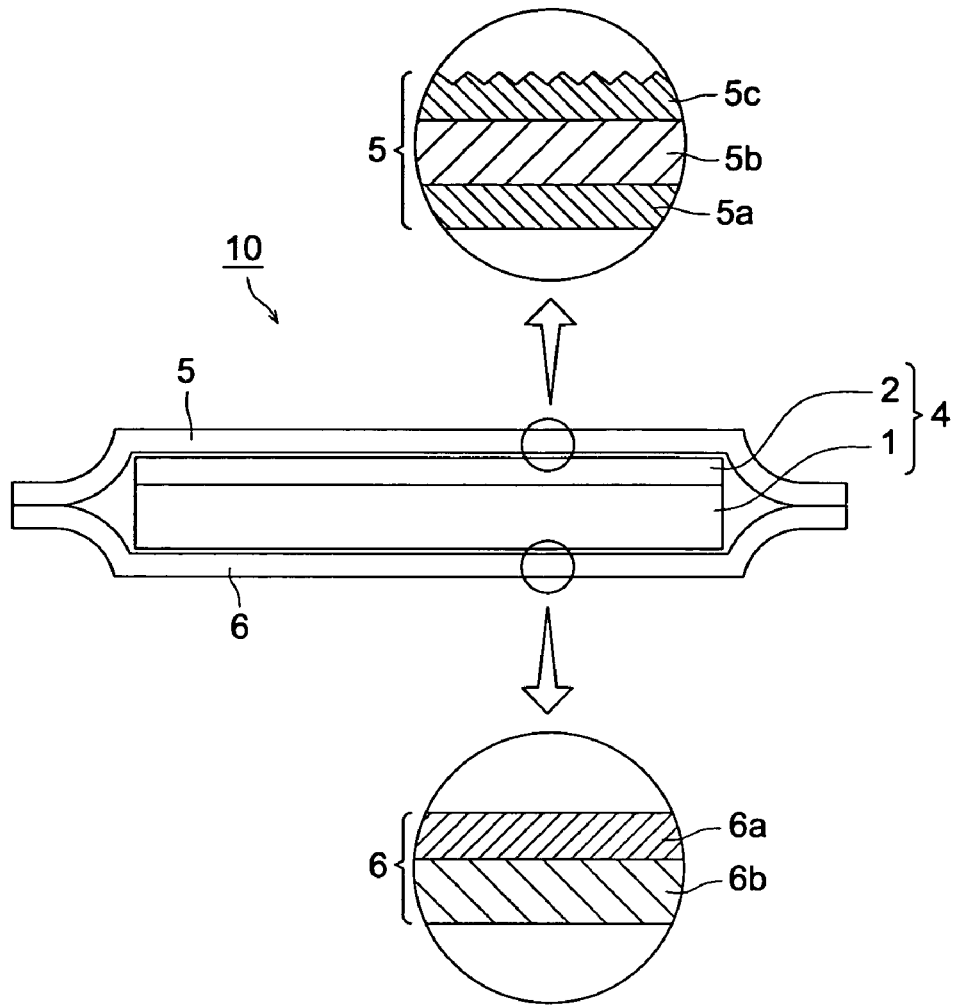
FIG. 1 shows a schematic cross-sectional view of scintillator plate 10.

The above object of the present invention is accomplished by the following structures.

(Structure 1) A scintillator plate possessing a support and provided thereon a phosphor layer, and further a first protective film provided on the phosphor layer to protect the phosphor layer, wherein an arithmetical mean slope angle $\Delta a$ of surface roughness of the protective film is 0.01-0.4.

(Structure 2) The scintillator plate of Structure 1, wherein the arithmetical mean slope angle $\Delta a$ is 0.02-0.2.

(Structure 3) The scintillator plate of Structure 1 or 2, wherein a second protective film is provided on a side of the support opposite the phosphor layer, the first protective film and the second protective film each extend beyond edges of the support, and peripheral portions of the first protective film and the second protective film are adhered to each other.

(Structure 4) The scintillator plate of any one of Structures 1-3, wherein the protective films each have a moisture permeability of more than 0 and not more than 50 $g/m^2 \cdot day$.

While the preferred embodiments of the present invention have been described using specific terms, such description is for illustrative purposes only, and it is to be understood that changes and variations may be made without departing from the spirit or scope of the appended claims.

DETAILED DESCRIPTION OF THE INVENTION

The best mode for carrying out the present invention as an embodiment will be explained as follows, referring to the drawings. Though there are various limitations which are technically preferable for carrying out the present invention in the following embodiment, a scope of the present invention is not limited to the following embodiment and illustrations.

The 1st Embodiment

Scintillator plate 10 relating to the first embodiment is one that receives radiation such as X-ray transmitted through an object and converts the radiation into fluorescence. Specifically, scintillator plate 10 has therein plate body 4, first protective film 5 and second protective film 6 as shown in FIG. 1, and it has a structure in which plate body 4 is sealed between first protective film 5 and second protective film 6.

Plate body 4 is composed of support 1 and phosphor layer 2, and phosphor layer 2 is formed on support 1.

Support 1 is radiation-transmittable, and is formed from various kind of polymer material plates, a metal plate, a carbon fiber reinforced resin sheet or such. They are preferably ones processable to sheets or web exhibiting plasticity for support 1, and plastic films such as a cellulose acetate film, a polyester film, a polyethylene terephthalate film, a polyethylene naphthalate film, a polyamide film, a polyimide film, a triacetate film and a polycarbonate film are preferably usable for support 1 in view of this angle.

The surface of support 1 (contact surface of support 1 with phosphor layer 2) may be smooth-surfaced, it may be matted in order to enhance adhesion to phosphor layer 2, or a subbing layer may also be formed on the surface of support 1 in order to enhance adhesion to phosphor layer 2.

Phosphor layer 2 is exposed to radiation, and is instantly to generate fluorescence corresponding to the dose. Phosphor layer 2 is a layer in which a given solution containing a commonly known raw material is coated on support 1 and dried, and the phosphor layer is composed of $Gd_2O_2S:Pr$.

First protective film 5 is provided on phosphor layer 2 of plate body 4 to protect plate body 4 (specifically phosphor layer 2). Specifically, first protective film 5 having a three-layer structure composed of adhesion layer 5a, protective layer 5b and transparent layer 5c is shown in enlarged illustration of FIG. 1.

Adhesion layer 5a is made of a commonly known adhesive, and adheres to phosphor layer 2 of plate body 4 and also to second protective film 6.

Protective layer 5b is a layer as a base substrate of protective layer 5, and is made of a resin film such as a polyester film, polymethacrylate film, a nitrate film, a cellulose acetate film, a polypropylene film, a polyethylene terephthalate film or a polyethylene naphthalate film. As protective layer 5b, a polypropylene film, a polyethylene terephthalate film and a polyethylene naphthalate film are preferable in view of transparency and durability of protective layer 5.

Transparent layer 5c is a layer that positively allows transmission of fluorescence that has entered first protective film 5 from phosphor layer, and it specifically is one wherein a coating solution containing fluorine-based resins and inorganic substances is heat-treated and hardened. As the fluorine-based resins, a polymer of olefin (fluoroolefin) containing fluorine and a copolymer including olefin that contains fluorine as copolymer components are applicable, while, as the inorganic substance, silica and others are applicable.

Transparent layer 5c is the surface layer of first protective film 5, and an arithmetical mean slope angle Δa of the surface roughness is 0.01-0.4, but preferably 0.02-0.2 and more preferably 0.05-0.2, whereby it is avoided that fluorescence entering into first protective film 5 travels continuously with repeated reflection at the upper and lower interfaces of protective layer 5b. The term "arithmetical mean slope angle Δa" is an arithmetical mean slope angle specified in JIS-B0660 (1998).

Second protective film 6 is one that is located under support 1 of plate body 4 and protects plate body 4. Specifically, protective film 6 has a two-layer structure composed of adhesion layer 6a and protective layer 6b, as shown in FIG. 1 that is an enlarged view.

Adhesion layer 6a is the same as aforesaid adhesion layer 5a, and it is adhered to support 1 of plate body 4 and to first protective film 5. Protective layer 6b is a layer that serves as a base substrate of protective film 6, and it is composed of the same materials as those enumerated in the explanation of aforesaid protective layer 5b. However, protective layer 5b and protective layer 6b may be either the same or different in terms of materials constituting them.

First protective film 5 and second protective film 6 mentioned above extend beyond the edges of plate body 4 (each of first protective film 5 and second protective film 6 has a longer length than that of plate body 4), and the peripheral portions of first protective film 5 and second protective film 6 are adhered to each other by adhesion layer 5a and adhesion layer 6a, as shown in FIG. 1. Due to the structure of this kind, plate body 4 is completely sealed by first protective film 5 and second protective film 6, so that moisture infiltration from an outer circumferential portion of plate body 4 is prevented.

Further, first protective film 5 and second protective film 6 each have a moisture permeability of more than 0 and not more than 50 $g/m^2 \cdot day$. When first protective film 5 and second protective film 6 each have a moisture permeability of more than 0 and not more than 50 $g/m^2 \cdot day$, first protective film 5 and second protective film 6 can prevent moisture effectively from entering from the outside of each of these protective films. When first protective film 5 and second protective film 6 each have a moisture permeability of more than 50 $g/m^2 \cdot day$, it is not preferable that moisture is possible to enter from the outside of each of these protective films, and to have an influence on degradation of emission luminance. In addition, first protective film 5 and second protective film 6 each preferably have a moisture permeability of 0.01-10 $g/m^2 \cdot day$, and more preferably have a moisture permeability of 0.05-1 $g/m^2 \cdot day$.

Next, a method of manufacturing scintillator plate 10 will be described.

First, phosphor raw material and a binder are added into an appropriate solvent, and the resulting solution is sufficiently mixed to prepare a coating solution in which each of particles of the phosphor raw material and the binder is evenly dispersed in the solution (coating solution preparation process). The treatment may be conducted in the coating solution preparation process, employing a homogenizer such as a ball mill, a sand mill, an attritor, a three-pole mill, a high-speed impeller homogenizer, a Kady mill, or an ultrasonic homogenizer.

Added may be 0.01-1 parts by weight of binder for preparation of a coating solution, based on parts by weight of phosphor raw material, but a low level of the binder addition amount is preferable in view of sensitivity and sharpness of scintillator plate 10. Preferably added is 0.03-0.2 parts by weight of binder, based on parts by weight of phosphor raw material in consideration of ease of coating with a coating solution.

Typical examples of the binder include protein such as gelatin; polysaccharide such as dextran; natural high-polymer material such as gum Arabic; and synthetic high-polymer material such as polyvinyl butyral, polyvinyl acetate, nitrocellulose, ethyl cellulose, vinylidene chloride, vinyl chloride copolymer, polyalkyl (metha) acrylate, vinyl chloride/vinyl acetate copolymer, polyurethane, cellulose acetate butyrate, polyvinyl alcohol or linear polyester.

Of the binders, a mixture of nitro cellulose, linear polyester, polyacryl (metha) acrylate and nitro cellulose with linear polyester; a mixture of nitro cellulose and polyalkyl (metha) acrylate, and a mixture of polyurethane and poly vinyl butyral are particularly preferable. These binders may be ones bridged by a cross-linking agent.

Specific examples of the solvent to prepare a coating solution include lower alcohol such as methanol, ethanol, isopropanol or n-butanol; ketone such as acetone, methyl-ethyl ketone, methyl-isobutyl ketone or cyclo-hexanone; ester of lower alcohol and lower fatty acid such as methyl acetate, ethyl acetate or acetate n-butyl; ether such as dioxane, ethylene glycol monoethyl ether or ethylene-glycol monomethyl ether; an aromatic compound such as triol or xylol; halogenated hydrocarbon such as methylene chloride or ethylene chloride; and the mixture thereof.

Various additives such as a dispersant, a plasticizer and the like may be incorporated in a solvent in order to improve not only dispersibility of phosphor raw material in the coating solution, but also to enhance a binding force between phosphor and a binder in phosphor layer 2.

Specific examples of the dispersant include a phthalic acid, a stealic acid, a kaplon acid, a lipophilic surfactant, and so forth. Specific examples of the plasticizer include ester phosphate such as triphenyl phosphate, tricresyl phosphate or diphenyl phosphate; ester phthalate such as diethyl phthalate or dimetoxy ethyl phthalate; glycolic acid ester such as glycolic acid ethyl phthalyl ethyl or glycolic acid butyl phthalyl butyl; and polyester of polyethylene glycol and fatty group dibasic acid such as polyester of triethylene glycol and adipic acid, and polyester of diethylene glycol and succinic acid.

After completing the treatment in the coating solution preparation process, the resulting coating solution is evenly coated onto the surface of support 1 to form a coated layer of the coating solution on support 1 (coating process). The coating process may be finished employing a conventional means such as a doctor blade, a roll coater or a knife coater.

After completion of the coating process, a coating formed on support 1 is heated gradually to be dried, and phosphor layer 2 is formed (drying process), thus, making of plate body 4 is terminated. A layer thickness of phosphor layer 2 is usually 20 μm-1 mm, and it preferably is 50-500 μm, although it varies depending upon characteristics of aimed scintillator plate 10, a type of phosphor (raw material) and a mixture ratio of the phosphor (raw material) to a binder.

After completion of the drying process, or separately from respective processes from the aforesaid manufacturing process to the drying process, first protective film 5 and second protective film 6 are made (preparing process of protective film).

In preparing first protective film 5, a coating solution containing fluorine-based resins and inorganic substances is coated on the surface on one side of protective layer 5b and this coating solution thus coated is heat-treated to form transparent layer 5c, and then, bonding agents are coated on the surface on the other side of protective layer 5b to form adhesion layer 5a. In preparing protective film 6, bonding agents are coated on the surface on one side of protective layer 6b to form adhesion layer 6a.

After completion of respective processes of the aforesaid drying process and the preparing process of the protective film, plate body 4 is arranged between first protective film 5 and second protective film 6 under the condition that adhesion layer 5a of first protective film 5 and adhesion layer 6a of protective film 6 are facing plate body 4, and then, a peripheral portion of first protective film 5 is superposed on a peripheral portion of second protective film 6 to be adhered each other, whereby, plate body 4 is sealed between first protective film 5 and second protective film 6 (sealing process). Thus, manufacture of scintillator plate 10 is terminated.

In the $1^{st}$ embodiment, moisture resistance of scintillator plate 10 can be maintained since plate body 4 is sealed by first protective film 5 and second protective film 6. The reduction of sharpness of scintillator plate 10 can further be avoided, since an arithmetical mean slope angle Δa of surface roughness of first protective film 5 (transparent film 5c) is arranged to at least 0.01 (refer to following EXAMPLE 1).

Incidentally, the present invention is not limited to the above-described $1^{st}$ embodiment, and various improvements and design changes may be conducted, provided that it does not depart from the major point of the present invention.

As for the improvement and design change item, each of adhesion layers 5a and 5b is composed of a heat fusible resin film, and peripheral portions of first protective film 5 and second protective film 6 each may be thermally sealed to each other by an impulse sealer or such to seal plate body 4. Preferable examples of the heat fusible resin film include an ethylene vinyl acetate copolymer (EVA) film, a polypropylene (PP) film and a polyethylene (PE) film.

When each of adhesion layers 5a and 5b is formed from a heat fusible resin film, a plurality of heat fusible resin films may be laminated, and in this case, a moisture resistance property of first protective film 5 and second protective film 6 can be improved. Any commonly known method can be employed as a lamination technique of the heat fusible resin film, and from the viewpoint of workability, it is preferred to use a dry laminate technique.

As for another improvement and design change item, a plurality of resin films may be laminated for each of protective layers 5b and 6b, and in this case, a moisture resistance property of first protective film 5 and second protective film 6 can be improved. Any commonly known method can be employed as a lamination technique of each of protective layers 5b and 6b, and from the viewpoint of workability, it is preferred to use a dry laminate technique.

An evaporated film may be employed in place of or together with a resin film for each or equivalent to each of protective layers 5b and 6b (in the case of employing an evaporated film together with a resin film, an evaporated film is provided between a resin film (i.e., a protective layer and adhesion layer 5a or 6a). The term "Evaporated film" means a metal oxide such as alumina or silica, which is evaporated onto a polyester film, polymethacrylate film, a nitrate film, a cellulose acetate film, a polypropylene film, a polyethylene terephthalate film or a polyethylene naphthalate film.

A plurality of evaporated films may be laminated in this case, and a moisture resistance property of first protective film 5 and second protective film 6 are possible to be improved. Any commonly known method can be employed as a lamination technique for evaporated films, and from the viewpoint of workability, it is preferred to use a dry laminate technique.

As for another improvement and design change item, as protective layer 5b with no transparent layer 5c, employed may be a resin film having an arithmetical mean slope angle Δa of the surface roughness being 0.01-0.4, but preferably 0.02-0.2 and more preferably 0.05-0.2. In this case, the resin film is selectable as protective layer 5b, since the resin film is commercially available as a commercialized product in the market.

The $2^{nd}$ Embodiment

Figure 2:
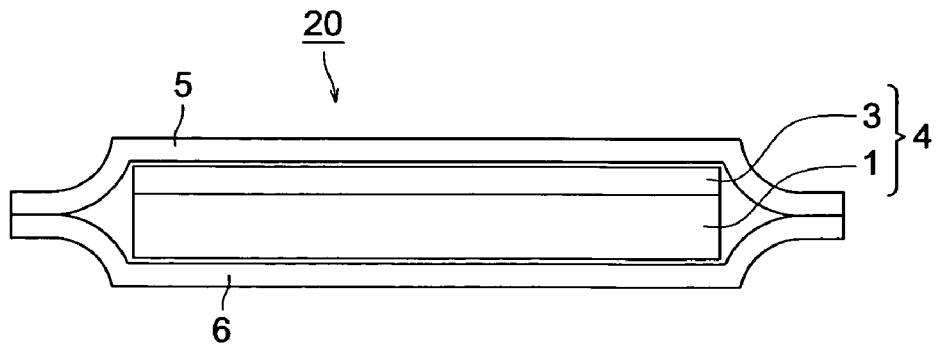
FIG. 2 shows a schematic cross-sectional view of scintillator plate 20.

A structure of phosphor layer 3 (in FIG. 2) corresponding to phosphor layer 2 (in FIG. 1) of plate body 4 in scintillator plate 20 relating to $2^{nd}$ embodiment, together with a manufacturing process thereof are different from those in the case of above-described phosphor layer 2, and the structure and the manufacturing process (including improvement and design change items) other than the foregoing structure and manufacturing process are the same as in the case of scintillator plate 10 of the $1^{st}$ embodiment.

Figure 3:
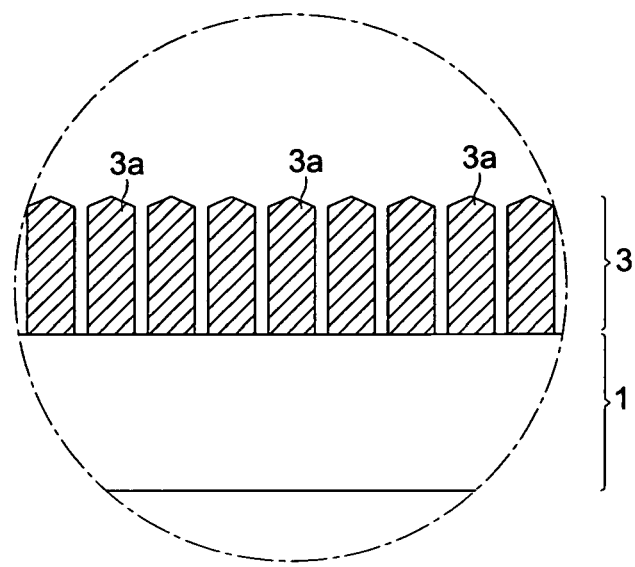
FIG. 3 shows an enlarged schematic cross-sectional view of scintillator plate 20.

Phosphor 3 is formed via evaporation of phosphor raw material, and as shown in FIG. 3, a number of columnar crystals 3a are formed on support 1 as an aggregate. Phosphor raw material of phosphor 3 contains a base material and an activator. Examples of the base material include cesium iodide and cesium bromide, and also examples of the activator include thallium, europium, indium, lithium, potassium, rubidium, sodium, copper, cerium, zinc, titanium, gadolinium and terbium. Of these for phosphor raw material as an evaporation source of phosphor layer 3, cesium iodide is preferable as the base material, and thallium is also preferable as the activator.

Next, evaporator 61 applicable to manufacture of plate body 4 of scintillator plate 20 will be explained.

Figure 4:
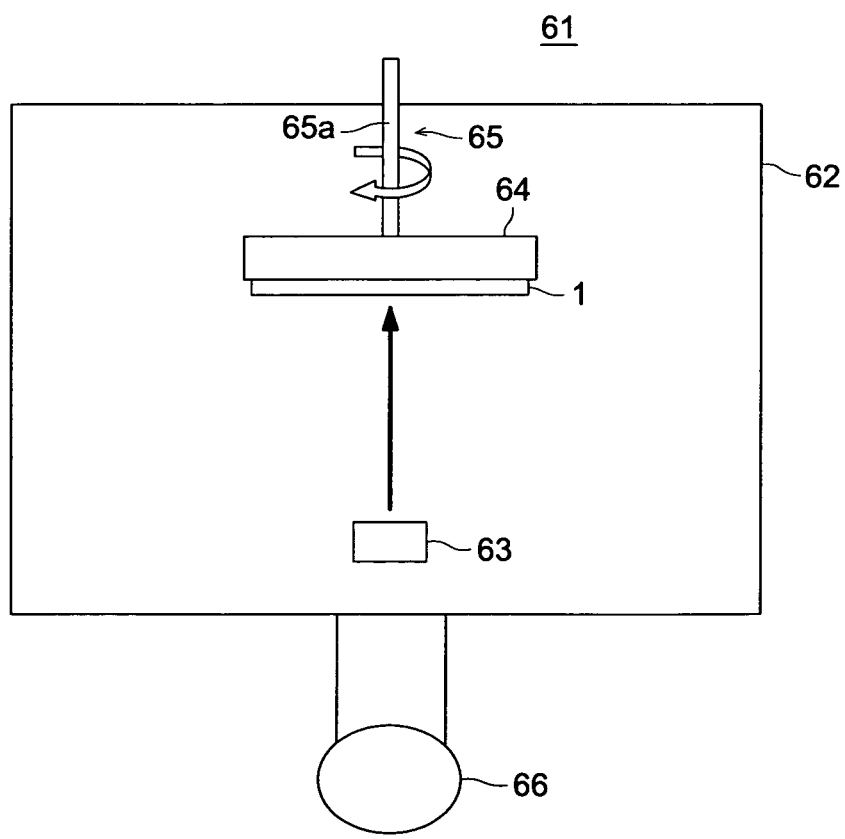
FIG. 4 is a schematic diagram of evaporator 61.

As shown in FIG. 4, evaporator 61 has box-shaped vacuum vessel 62, and boat 63 for vacuum evaporation is arranged in vacuum vessel 62. Boat 63 is a member for an evaporation source, and an electrode is connected to boat 63. When boat 63 is live with electricity through the electrode, boat 63 generates heat with Joule's heat. In the course of manufacturing scintillator plate 20, mixtures (phosphor raw materials) containing a base material and an activator are filled in boat 63, and when boat 63 is live with electricity, the aforesaid mixtures are heated to evaporate.

Meanwhile, as a member for an evaporation source, either a crucible made of alumina around which a heater is wound, or a heater made of high melting point metal may be used.

Holder 64 supporting support 1 is arranged immediately above boat 63 inside vacuum vessel 62. A heater (not shown) is arranged on holder 64, so that support 1 mounted on holder 64 may be heated by operating the heater. When support 1 is heated, it is possible to conduct releasing and removing of absorptive material on the surface of support 1, to prevent that an impure substance layer is formed between support 1 and phosphor layer 2 formed on the surface of support 1 to strengthen adhesion between support 1 and phosphor layer 2 formed on the surface of support 1 and to conduct adjustment of layer quality of phosphor layer 2 formed on the surface of support 1.

Rotational mechanism 65 that rotates holder 64 is arranged on holder 64. Rotational mechanism 65 is composed of rotational axis 65a connected to holder 64 and of a motor (not shown) serving as its driving source, and when the motor is driven, rotational axis 65a is rotated to rotate holder 64 under the condition that holder 64 faces boat 63.

In evaporator 61, vacuum pump 66 is arranged in vacuum vessel 62, in addition to the aforesaid structure. Vacuum pump 66 is one to evacuate inner air of vacuum vessel 62 and to introduce gas into vacuum vessel 62, and when vacuum pump 66 is operated, an inside of vacuum vessel 62 can be kept to be under the ambient atmosphere of gas under constant pressure.

Next, a manufacturing method for phosphor layer 3 will be explained.

In a manufacturing method for plate body 4, evaporator 61 explained above can be used favorably. A method of manufacturing plate body 4 by using evaporator 61 will be explained as follows.

First, support 1 is mounted on holder 64, and mixtures (phosphor raw materials) containing a base material and an activator are filled in boat 63 (preparation process). In this case, it is preferable that a distance between boat 63 and support 1 is set to 100-1500 mm, and an evaporation process described later is conducted while keeping the range of the established values.

After completion of processing for the preparation process, vacuum pump 66 is operated to evacuate the inside of vacuum vessel 62 once, and then, the inside of vacuum vessel 62 is made to be at the prescribed degree of vacuum, while introducing inert gas (argon gas or nitrogen gas) into vacuum vessel 62 (vacuum atmosphere forming process).

In the vacuum atmosphere forming process, a heater of holder 64 and a motor of rotational mechanism 65 are driven simultaneously with forming of vacuum atmosphere, to heat and rotate under the condition that support 1 mounted on holder 64 faces boat 63 (second preparation process).

Under this situation, electrical current is carried from the electrode to boat 63 so that phosphor raw materials containing a base material and an activator may be heated to be evaporated (evaporation process). As a result, innumerable columnar crystals 3a grow gradually on the surface of support 1, and aimed phosphor layer 3 is formed on support 1. Owing to this, plate body 4 of scintillator plate 20 can be manufactured.

Even in the present second embodiment, first protective film 5 and second protective film 6 which are the same as those for scintillator plate 10 relating to the first embodiment are provided. Therefore, it is possible to prevent a decline of sharpness while maintaining moisture resistance performance of scintillator plate 20 (refer to following EXAMPLE 2).

EXAMPLE

Example 1

(1) Preparation of Samples 1-6

(1.1) Preparation of Plate Body (Via Coating)

Two hundred grams of phosphor ($Gd_2O_2S:Pr$), 8.0 g of polyurethane resin (PANDEX T5265, produced by Dainippon Ink and Chemicals, Inc.), and 2.0 g of epoxy resin (EP1001 manufactured by Yuka-Shell Epoxy Co., Ltd.) as a yellow resistance agent were added into a methyl ethyl ketone solvent, and dispersed by a propeller mixer to prepare a coating solution to form a phosphor layer having 30 Pa·s (25° C.) in viscosity. This coating solution was coated on a polyethylene terephthalate film (support) having a thickness of 300 mm, and was dried to obtain a plate body in which a phosphor layer having a thickness of 230 mm is formed on the support. Together with this plate body, 5 more plate bodies were prepared to make a total of 6 plate bodies.

(1.2) Preparation of Protective Films

Fifty grams of fluoroolefin-vinylether copolymer (LUMIFLON LF100, 50% by weight of xylene solution, produced by Asahi Glass Co., Ltd.) as a fluorine based resin, 5 g of a cross-linking agent (CORONATE HX, solid content: 100% by weight, produced by Nippon Polyurethane Industry Co., Ltd.), and 0.5 g of alcohol-modified silicone oligomer having dimethyl polysiloxane moiety with hydroxy groups (carbinol group) at bi-terminal (X-22-2809, manufactured by Shin-Etsu Chemical Co., Ltd., solid content: 66% by weight) were added into a methyl ethyl ketone solution to prepare a coating solution having 0.1-0.3 Pa·s in viscosity.

A dispersion, in which silica having a particle diameter of 0.2-2.0 mm was dispersed in methyl ethyl ketone, was added into the above-described coating solution and the resulting was coated as a protective film on the surface of a polyethylene terephthalate film employing a doctor blade. This polyethylene terephthalate film was subsequently heat-treated at 120° C. for 20 minutes, and was thermally cured to form a transparent layer on the protective layer. In this case, 6 protective films having an arithmetical mean slope angle Δa of the surface roughness being 0.005-0.40 were prepared by adjusting an addition amount of the above-described silica (refer to Table 1 shown below). In addition, any of protective films has a moisture permeability of at most 50 g/m²·day.

(1.3) Adhesion of Protective Films

An adhesive (VYLON 300, produced by Toyobo Co., Ltd.) was coated on one surface of each protective film (surface having no arithmetical mean slope angle Δa), and was dried to form an adhesion layer having a thickness of 1 μm on one surface of each protective film. The protective film adheres to the plate body employing a riding roll by attaching each of protective films onto 6 plate bodies film-by-film after facing an adhesion layer of the protective film to a phosphor layer of the plate body. The resulting products corresponding to scintillator plates were designated as "samples 1-6" having various values of arithmetical mean slope angle Δa of surface roughness of the protective films (refer to Table 1 shown below).

(2) Sharpness Evaluation of Samples 1-6

Each of samples 1-6 was set to a CMOS flat panel (X-ray CMOS camera system Shad-o-Box 4KEV, produced by Radicon Imaging Corp.) having a size of 10 cm×10 cm, each of samples 1-6 was measured with output data of 12 bits to calculate MTF.

Specifically, X-ray of a tube voltage of 80 kVp was irradiated from the back surface of each of samples 1-6 (the surface on which no phosphor layer was formed) through a MTF chart made of lead, and image data was detected with the CMOS flat panel to record the data on a hard disk. The recorded data on the hard disk was subsequently analyzed by a computer to calculate Modulation Transfer Function (MTF) of the X-ray image recorded on the hard disk. Calculated results of MTF value (%) determined at a space frequency of 1 cycle/mm are shown in following Table 1. As is clear from the results in Table 1, The higher the MTF value is, the superior the sharpness is.

TABLE 1

| Sample No. | Phosphor layer | Arithmetical mean slope angle Δa | MTF (%) |
|---|---|---|---|
| 1 | Via coating | 0.005 | 70 |
| 2 | | 0.01 | 72 |
| 3 | | 0.05 | 79 |
| 4 | | 0.10 | 82 |
| 5 | | 0.20 | 76 |
| 6 | | 0.40 | 72 |

(3) Evaluated Results

As is clear from Table 1, it is to be understood that MTF values of samples 2-6 are higher than MTF value of sample 1, whereby an arithmetical mean slope angle Δa of surface roughness of the protective film being at least 0.01 is effectively useful. It is also to be understood that since MTF values of samples 3-5 are particularly high among these, an arithmetical mean slope angle Δa of surface roughness of the protective film being 0.02-0.2 is more effectively useful.

In addition, regarding samples having an arithmetical mean slope angle Δa of surface roughness of the protective film being more than 0.40, the surface of the protective film is particularly roughened, whereby the protective film itself becomes milky-white, and the MTF value drops largely, though the data in this case are not shown in the present EXAMPLE 1.

Example 2

(1) Preparation of Samples 11-16

(1.1) Preparation of Plate Body (Via Evaporation)

A mixture of cesium iodide and thallium (CsI:0.003Tl) as phosphor raw material, a carbon fiber reinforced resin sheet as a support and the same evaporator as evaporator 61 in FIG. 4 as an evaporator are employed to form a phosphor layer on the support.

Specifically, the above-described mixture in powder form is placed in a boat as an evaporation material, and the support is set in a holder to adjust the distance between the boat and the holder to 400 mm. Successively, after the interior of an evaporator was once evacuated by using a vacuum pump, an Ar gas was introduced into the interior of the evaporator to adjust a vacuum degree to 0.5 Pa Next, a motor in the rotational mechanism and a holder heater were operated and a support was heated to 150° C. while rotating the support at a speed of 10 rpm. In this situation, an electric current was passed through an electrode to a boat, and the above-described mixture charged in the boat was evaporated by heating to form a phosphor layer on the support. Deposition via evaporation onto the support was terminated when the thickness of the phosphor layer reached 500 μm, and a plate body was obtained. Together with this plate body, 5 more plate bodies were prepared to make a total of 6 plate bodies.

(1.2) Preparation and Adhesion of Protective Films

As described in each of items (1.2) and (1.3) of the foregoing EXAMPLE 1, each of protective films adheres to the above-described plate body film-by-film after preparing the protective films. The resulting products corresponding to scintillator plates were designated as "samples 11-16" having various values of arithmetical mean slope angle Δa of surface roughness of the protective films (refer to Table 2 shown below).

(2) Sharpness Evaluation of Samples 11-16

Each of samples 11-16 was set to a CMOS flat panel (X-ray CMOS camera system Shad-o-Box 4KEV, produced by Radicon Imaging Corp.) having a size of 10 cm×10 cm, each of samples 1-6 was measured similarly to (2) of foregoing EXAMPLE 1 to calculate MTF.

TABLE 2

| Sample No. | Phosphor layer | Arithmetical mean slope angle Δa | MTF (%) |
|---|---|---|---|
| 11 | Via evaporation | 0.005 | 69 |
| 12 | | 0.01 | 73 |
| 13 | | 0.05 | 80 |
| 14 | | 0.10 | 85 |
| 15 | | 0.20 | 78 |
| 16 | | 0.40 | 74 |

(3) Evaluated Results

As is clear from Table 2, it is to be understood that MTF values of samples 12-16 are higher than MTF value of sample 11, whereby an arithmetical mean slope angle Δa of surface roughness of the protective film being at least 0.01 is effectively useful. It is also to be understood that since MTF values of samples 13-15 are particularly high among these, an arithmetical mean slope angle Δa of surface roughness of the protective film being 0.02-0.2 is more effectively useful.

In addition, regarding samples having an arithmetical mean slope angle Δa of surface roughness of the protective film being more than 0.40, the surface of the protective film is particularly roughened, whereby the protective film itself becomes milky-white, and the MTF value drops largely, though the data in this case are not shown in the present EXAMPLE 2.

EFFECT OF THE INVENTION

In the present invention, a moisture resistance property can be maintained by providing a protective film, and reduction of sharpness can further be avoided by arranging an arithmetical mean slope angle Δa of surface roughness of the protective film at the predetermined condition (refer to Examples 1 and 2).

What is claimed is:

1. A scintillator plate comprising a support and provided thereon a phosphor layer comprising cesium iodide as a base material, and further a first protective film having a moisture permeability of more than 0 and not more than 50 g/m$^2$ · day, provided on the phosphor layer to protect the phosphor layer,
    wherein the first protective film has a layer structure composed of an adhesion layer, an evaporated film, a protective layer, and a transparent layer for transmission of fluorescence, and
    wherein the evaporated film is provided between the adhesion layer and the protective layer, and the transparent layer as a surface layer of the first protective film has an arithmetical mean slope angle Δa of surface roughness of 0.01 -0.4.

2. The scintillator plate of claim 1, wherein the arithmetical mean slope angle Δa is 0.02-0.2.

3. The scintillator plate of claim 1, wherein a second protective film also having a moisture permeability of more than 0 and not more than 50 g/m$^2$·day, is provided on a side of the support opposite the phosphor layer, the first protective film and the second protective film each extend beyond edges of the support, and peripheral portions of the first protective film and the second protective film are adhered to each other.

* * * * *